A. McDONALD.
Cotton Seed Planter.

No. 20,572.

2 Sheets—Sheet 1.

Patented June 15, 1858.

A. McDONALD.
Cotton Seed Planter.

No. 20,572.

2 Sheets—Sheet 2.

Patented June 15, 1858.

UNITED STATES PATENT OFFICE.

A. McDONALD, OF SALEM, MISSISSIPPI.

IMPROVEMENT IN COTTON-SEED PLANTERS.

Specification forming part of Letters Patent No. 20,572, dated June 15, 1858.

*To all whom it may concern:*

Be it known that I, ARNOLD McDONALD, of Salem, in the county of Tippah and State of Mississippi, have invented a new and useful Machine for Planting Corn and Cotton-Seed, and styled "McDonald's Cotton-Seed and Corn Planter;" and I do hereby declare that the following is a full, clear, and exact description of the construction and operation of the same, reference being had to the annexed drawings, making a part of this specification, in which—

Figure 1:
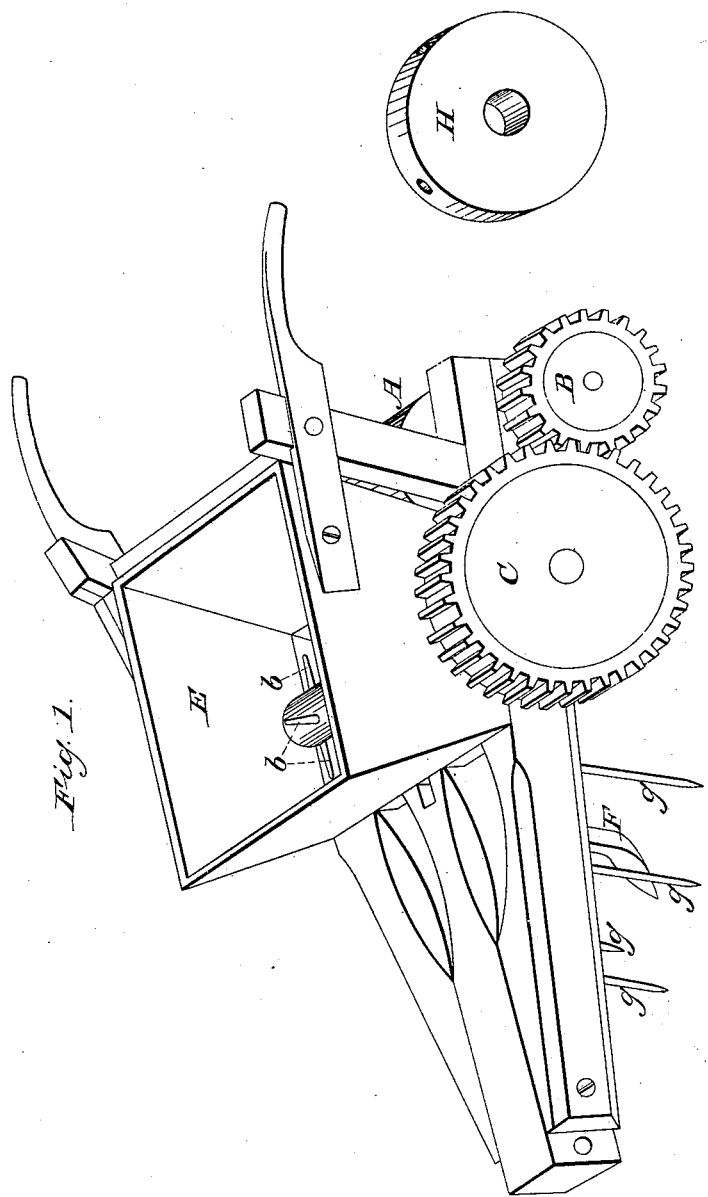
Figure 2:
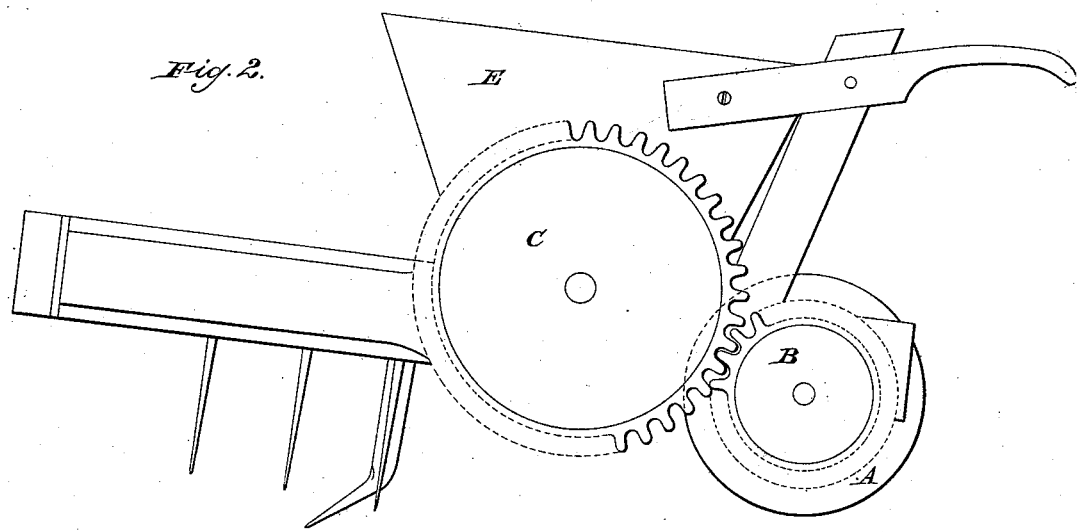

Figure 1 is a perspective view; Fig. 2, a longitudinal elevation, and Fig. 3 a transverse section.

In Fig. 1, $g\ g\ g\ g$ are harrow-teeth for clearing the ridge of trash and clods. F is a colter for opening drill, and E is the hopper.

Figure 3:
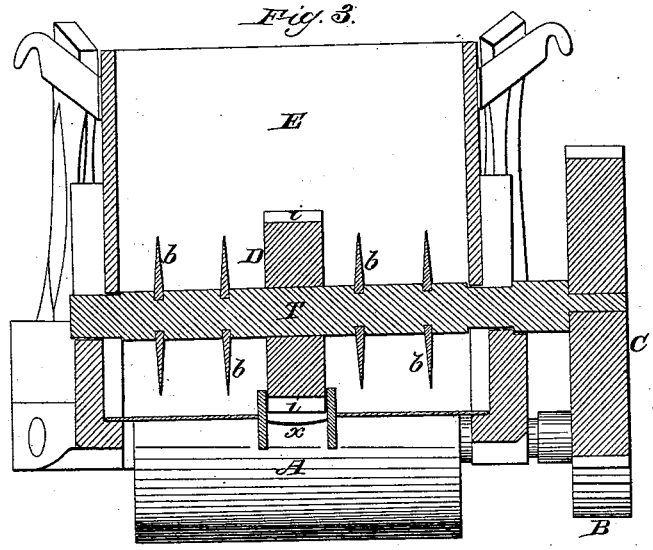

In Fig. 3, T is a shaft, to which is attached the grooved seed-distributing wheel D and stirrers $b\ b\ b\ b$. $i\ i$ are grooves in the seed-distributing wheel D. $x\ x$ is an opening in the bottom of the hopper E, through which the grooves $i\ i$ of the seed-distributing wheel D pass and deposit the seed regularly in the drill. A is a roller for covering the seed.

In Fig. 1, B is a cog-wheel on the roller-axle, and C a cog-wheel on shaft T.

When the machine is in motion the roller A, turning on the ground, gives motion to the cog-wheel B on its axle, which, turning into the cog-wheel C, gives motion to the shaft T and its grooved seed-distributing wheel D and and stirrers $b\ b\ b\ b$. The stirrers $b\ b\ b\ b$ keep the seed in constant agitation and cause them to fill the grooves $i\ i$ in the seed-distributing wheel D, which, in passing through the opening $x\ x$ in the bottom of hopper E, deposits them in the drill, as shown in Fig. 3. The extra wheel H with four holes is for planting corn. It is to be attached to a shaft in the same manner that the seed-distributing wheel D is attached to the shaft T.

To plant corn it will only be necessary to remove the shaft T, with its distributing-wheel D and stirrers $b\ b\ b\ b$, and substitute a shaft with the wheel H attached in its stead, which is operated by means of the cog-wheels B and C, as already shown for planting cotton.

What I claim as my invention, and desire to secure by Letters Patent, is—

The combination of shaft T, its grooved seed-distributing wheel D, and stirrers $b\ b\ b\ b$ with hopper E, the whole being constructed, arranged, and operating in the manner and for the purpose herein described.

A. McDONALD.

Attest:
WILL AYRES.
A. M. AYRES.